United States Patent
Ho et al.

(10) Patent No.: US 8,638,773 B2
(45) Date of Patent: Jan. 28, 2014

(54) RLC FOR MULTI-CARRIER LTE SYSTEMS

(75) Inventors: Sai Yiu Duncan Ho, San Diego, CA (US); Rajat Prakash, La Jolla, CA (US); Parag A. Agashe, San Diego, CA (US); Fatih Ulupinar, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 12/694,048

(22) Filed: Jan. 26, 2010

(65) Prior Publication Data

US 2010/0215006 A1 Aug. 26, 2010

Related U.S. Application Data

(60) Provisional application No. 61/148,324, filed on Jan. 29, 2009.

(51) Int. Cl.
H04W 28/06 (2009.01)
(52) U.S. Cl.
USPC .......................... 370/349; 370/412; 370/474
(58) Field of Classification Search
None
See application file for complete search history.

(56) References Cited

U.S. PATENT DOCUMENTS

| | | | |
|---|---|---|---|
| 6,307,867 B1 * | 10/2001 | Roobol et al. | 370/470 |
| 6,950,420 B2 * | 9/2005 | Sarkkinen et al. | 370/338 |
| 7,136,396 B2 * | 11/2006 | Francoeur et al. | 370/473 |
| 2004/0151156 A1 * | 8/2004 | Noel et al. | 370/349 |
| 2007/0097981 A1 * | 5/2007 | Papasakellariou | 370/394 |
| 2008/0226074 A1 * | 9/2008 | Sammour et al. | 380/270 |
| 2009/0141678 A1 | 6/2009 | Sun et al. | |

FOREIGN PATENT DOCUMENTS

| | | |
|---|---|---|
| CN | 1773956 A | 5/2006 |
| CN | 101030842 A | 9/2007 |
| CN | 101217350 A | 7/2008 |
| EP | 1901494 | 3/2008 |
| JP | 2006050545 A | 2/2006 |
| JP | 2008288812 A | 11/2008 |
| JP | 2008547333 A | 12/2008 |
| WO | 2007003134 A1 | 1/2007 |

OTHER PUBLICATIONS

3GPP TS 25.322 V8.0.0 (Dec. 2007), pp. 1-89.*
Chao, S. et al.: "QoS Differentiation Adaptive Retransmission Limits ARQ for IEEE 802.16e BWA System," Vehicular Technology Conference:(2007), pp. 1534-1535.
International Search Report and Written Opinion—PCT/US2010/022616, International Search Authority—European Patent Office—Aug. 2, 2010.
Qualcomm Europe: "Introduction of blank subframe indication into SIB2", 3GPP TSG-RAN WG2 #64, R2-086572, Nov. 14, 2008.
Samsung: "Text proposal on the RLC architecture", 3GPP TSG-RAN2 Meeting#60 R2-075249, Nov. 2007.
Taiwan Search Report—TW099102694—TIPO—Apr. 29, 2013.

\* cited by examiner

*Primary Examiner* — Alex Skripnikov
(74) *Attorney, Agent, or Firm* — Steven A. Raney

(57) ABSTRACT

Certain embodiments of the present disclosure propose methods for supporting multicarrier in a radio link control (RLC) communication layer. The proposed methods reduce the processing required when scheduling information for each carrier becomes available by generating protocol data units (PDUs) in advance, and storing the PDUs in buffers associated with each carrier.

22 Claims, 6 Drawing Sheets

RLC FOR MULTI-CARRIER LTE SYSTEMS

CLAIM OF PRIORITY UNDER 35 U.S.C. §119

The present Application for patent claims benefit of U.S. Provisional Patent Application Ser. No. 61/148,324, entitled, "RLC for Multi-Carrier LTE Systems," filed Jan. 29, 2009, and assigned to the assignee hereof and hereby expressly incorporated by reference herein.

TECHNICAL FIELD

Certain embodiments of the present disclosure generally relate to wireless communications and, more particularly, to a multi-carrier radio link control (RLC) layer.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In prior art transmission systems using a single carrier, radio link control (RLC) protocol data units (PDUs) may be generated "on the fly" with a size equal to the size of a transport block (TB). The TBs containing the RLC PDUs are then provided to a medium access control (MAC) layer for further processing and transmission. However, in multi-carrier systems, such as in LTE-Advanced, each carrier may be implemented on a separate, discrete circuit card located within the evolved Node B (eNB). As a result, it is difficult to assign RLC service data units (SDUs) to different carriers and generate RLC PDUs "on the fly" because of the processing power that would be required to implement such a scheme.

SUMMARY

Certain aspects of the present disclosure provide a method for wireless communications. The method generally includes receiving one or more service data units (SDUs) in a radio link control (RLC) layer, generating one or more protocol data units (PDUs) from the received SDUs, storing the PDUs in one or more buffers associated with one or more carriers, wherein each PDU is stored in only one buffer, receiving scheduling information for each of the one or more carriers, adjusting the PDUs for each of the carriers based on the received scheduling information, and sending the adjusted PDUs to medium access control (MAC) layer for transmission on the corresponding carriers.

Certain aspects of the present disclosure provide a method for wireless communications. The method generally includes receiving one or more protocol data units (PDUs) on one or more carriers, determining if any of the one or more PDUs are lost during transmission, initializing a timer with a value, wherein the value depends at least on queuing delay for the one or more carriers and channel conditions for the one or more carriers, and requesting retransmission of the lost PDUs if the lost PDUs are not received before the timer expires.

Certain aspects of the present disclosure provide an apparatus for wireless communications. The apparatus generally includes logic for receiving one or more service data units (SDUs) in a radio link control (RLC) layer, logic for generating one or more protocol data units (PDUs) from the received SDUs, logic for storing the PDUs in one or more buffers associated with one or more carriers, wherein each PDU is stored in only one buffer, logic for receiving scheduling information for each of the one or more carriers, logic for adjusting the PDUs for each of the carriers based on the received scheduling information, and logic for sending the adjusted PDUs to medium access control (MAC) layer for transmission on the corresponding carriers.

Certain aspects of the present disclosure provide an apparatus for wireless communications. The apparatus generally includes logic for receiving one or more protocol data units (PDUs) on one or more carriers, logic for determining if any of the one or more PDUs are lost during transmission, logic for initializing a timer with a value, wherein the value depends at least on queuing delay for the one or more carriers and channel conditions for the one or more carriers, and logic for requesting retransmission of the lost PDUs if the lost PDUs are not received before the timer expires.

Certain aspects of the present disclosure provide an apparatus for wireless communications. The apparatus generally includes means for receiving one or more service data units (SDUs) in a radio link control (RLC) layer, means for generating one or more protocol data units (PDUs) from the received SDUs, means for storing the PDUs in one or more buffers associated with one or more carriers, wherein each PDU is stored in only one buffer, means for receiving scheduling information for each of the one or more carriers, means for adjusting the PDUs for each of the carriers based on the received scheduling information, and means for sending the adjusted PDUs to medium access control (MAC) layer for transmission on the corresponding carriers.

Certain aspects of the present disclosure provide an apparatus for wireless communications. The apparatus generally includes means for receiving one or more protocol data units (PDUs) on one or more carriers, means for determining if any of the one or more PDUs are lost during transmission, means for initializing a timer with a value, wherein the value depends at least on queuing delay for the one or more carriers and channel conditions for the one or more carriers, and means for requesting retransmission of the lost PDUs if the lost PDUs are not received before the timer expires.

Certain aspects provide a computer-program product for wireless communications, comprising a computer-readable medium having instructions stored thereon, the instructions being executable by one or more processors. The instructions generally include instructions for receiving one or more service data units (SDUs) in a radio link control (RLC) layer, instructions for generating one or more protocol data units (PDUs) from the received SDUs, instructions for storing the PDUs in one or more buffers associated with one or more carriers, wherein each PDU is stored in only one buffer, instructions for receiving scheduling information for each of the one or more carriers, instructions for adjusting the PDUs for each of the carriers based on the received scheduling information, and instructions for sending the adjusted PDUs to medium access control (MAC) layer for transmission on the corresponding carriers.

Certain aspects provide a computer-program product for wireless communications, comprising a computer-readable medium having instructions stored thereon, the instructions being executable by one or more processors. The instructions generally include instructions for receiving one or more protocol data units (PDUs) on one or more carriers, instructions for determining if any of the one or more PDUs are lost during transmission, instructions for initializing a timer with a value, wherein the value depends at least on queuing delay for the one or more carriers and channel conditions for the one or more carriers, and instructions for requesting retransmission of the lost PDUs if the lost PDUs are not received before the timer expires.

Certain aspects of the present disclosure provide an apparatus for wireless communications. The apparatus generally includes at least one processor configured to receive one or more service data units (SDUs) in a radio link control (RLC) layer, generate one or more protocol data units (PDUs) from the received SDUs, store the PDUs in one or more buffers associated with one or more carriers, wherein each PDU is stored in only one buffer, receive scheduling information for each of the one or more carriers, adjust the PDUs for each of the carriers based on the received scheduling information, and send the adjusted PDUs to medium access control (MAC) layer for transmission on the corresponding carriers.

Certain aspects of the present disclosure provide an apparatus for wireless communications. The apparatus generally includes at least one processor configured to receive one or more protocol data units (PDUs) on one or more carriers, determine if any of the one or more PDUs are lost during transmission, initialize a timer with a value, wherein the value depends at least on queuing delay for the one or more carriers and channel conditions for the one or more carriers, and request retransmission of the lost PDUs if the lost PDUs are not received before the timer expires.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
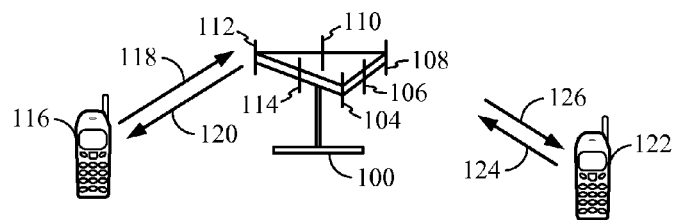
FIG. 1 illustrates a multiple access wireless communication system, in accordance with certain embodiments of the present disclosure.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
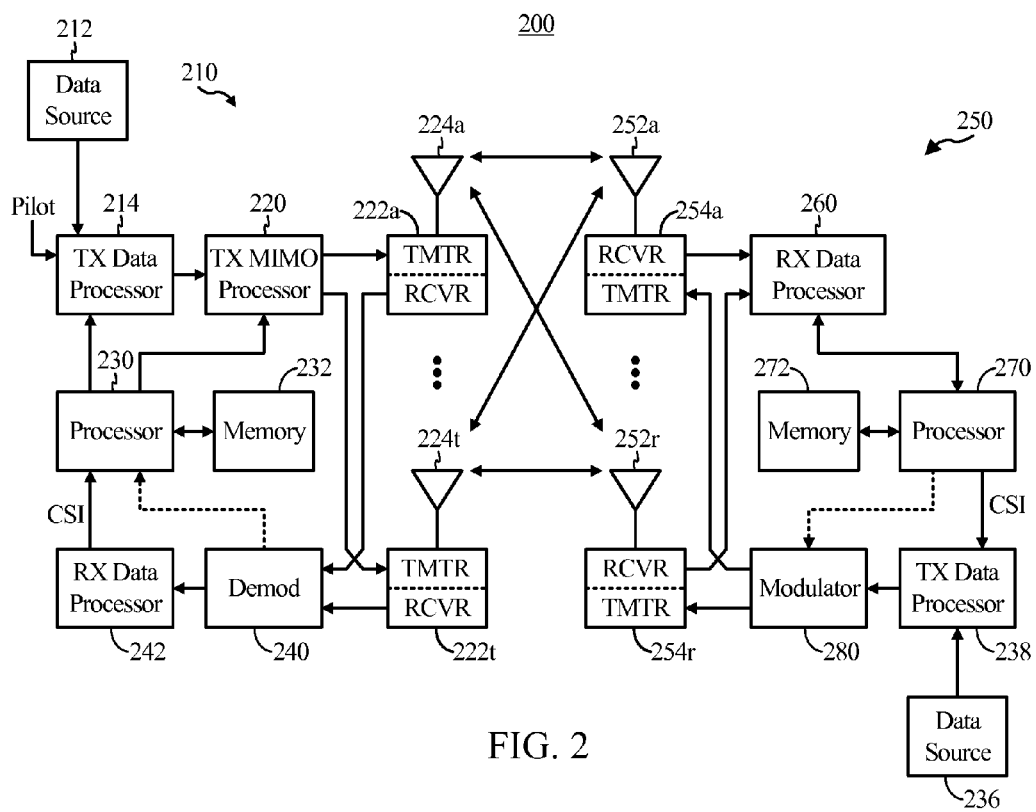
FIG. 2 illustrates a block diagram of a communication system, in accordance with certain embodiments of the present disclosure.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

RLC for Multi-Carrier LTE Systems

Certain embodiments of the present disclosure propose methods for supporting multicarrier in a radio link control (RLC) communication layer. The proposed methods reduce the processing required when scheduling information for each carrier becomes available by generating protocol data units (PDUs) in advance, and storing the PDUs in buffers associated with each carrier.

Figure 3:
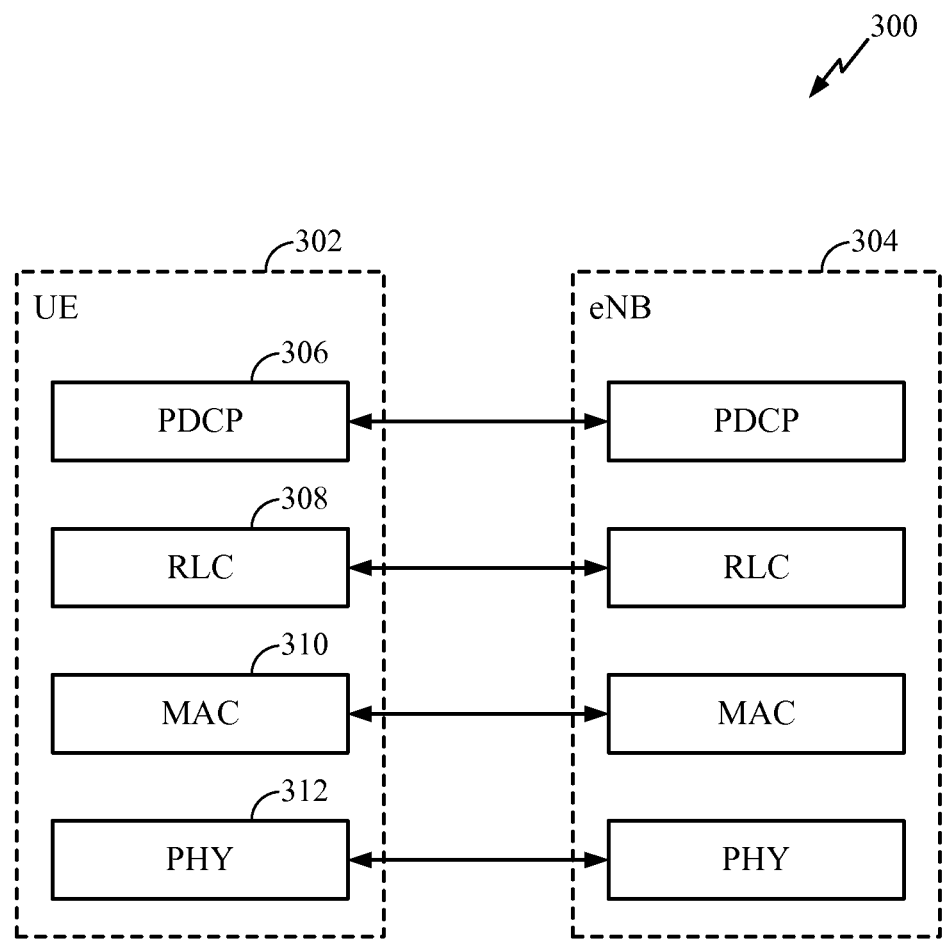
FIG. 3 illustrates user-plane protocol stack for a transmitter and a receiver in the long term evolution (LTE) standard.

In a wireless communication system, transmitters and receivers may communicate through a multiple layer protocol stack. FIG. 3 illustrates user-plane protocol stack for a user equipment (UE) 302 and an evolved node B (eNB) 304 in the LTE standard. The protocol stack may include a packet data convergence protocol (PDCP) layer 306, an RLC layer 308, a medium access control (MAC) layer 310 and a physical (PHY) layer 312. The physical layer performs the physical transport of data between the UE and the eNB.

In the transmitter side, each layer receives service data units (SDUs) from a higher layer, adds headers to the SDUs to generate PDUs, and sends the PDUs to a lower layer. The PDUs are treated as SDUs by the lower layer.

For multi-carrier operation in compliance with the LTE-Advanced standard, in non-transmit diversity case, there may be one transport block (TB) per serving carrier per transport time interval (TTI). The TBs for different carriers are independent from each other and may have different sizes. Therefore, during scheduling a downlink assignment, the scheduler may decide which serving carriers are used. In addition, for each carrier the scheduler may determine size of the TB based on the channel conditions.

Each carrier may be implemented in an eNB as a "channel card" which is physically separated from channel cards corresponding to the other carriers. Since the scheduler operates at TTI level and schedules the TB sizes in real-time, the actual size of the TB is not known in advance. Therefore, real-time packing of RLC PDUs may be needed to fill each TB when the scheduling information becomes available. However, assignment of RLC SDUs to different carriers and generation of RLC PDUs may require large amounts of processing time and power which could be very difficult if not impossible to perform in real-time.

In order to be able to fully utilize the bandwidth offered by multi-carrier, a radio bearer may need to access all of the serving carriers. Therefore, for certain embodiments, there may be a buffer associated with each carrier. Some data may be stored in each buffer before a TB size is decided. Hence, when a TB size is known, the data in the buffer may be used to fill the TB.

On the other hand, there may only be a single packet stream coming into the eNB for each radio bearer, therefore, certain embodiments propose an algorithm to dispatch the incoming packets across the buffers for different carriers ahead of scheduling. It may be very difficult if not impossible to try to distribute the packets and generate RLC PDUs on the fly across multiple carriers when the scheduling decision becomes available.

The proposed algorithm maximizes the link utilization over the air (OTA) while minimizing the possibility of packets getting out of order, which will simplify detection of missing packets at the receiver side. In addition, the proposed algorithm reduces the delay in reception of packets while utilizing multiple carriers. The algorithm takes into account metrics such as queue length of each buffer, average depleting speed of each buffer, and so on.

Certain embodiments of the present disclosure, propose an RLC layer in a multi-carrier system that generates segmented RLC packets even for the first transmission. It should be noted that the current single carrier RLC layer may only generate non-segmented RLC PDUs for the first transmission and segmented RLC PDUs for the subsequent retransmissions. The proposed method results in minimal change in current standards while increasing the efficiency of the system.

For certain embodiments, the proposed technique may also be used in a single carrier system, in which RLC PDUs are generated in advance, before the TB size is available. If the size of the TB is smaller than the size of the pre-generated RLC PDUs, the RLC PDUs may be segmented to fit the TB, even for the first transmission. One advantage of the proposed technique for a single carrier system is most of the processing (packing) can be done offline, before the actual size of the TB is available.

Figure 4:
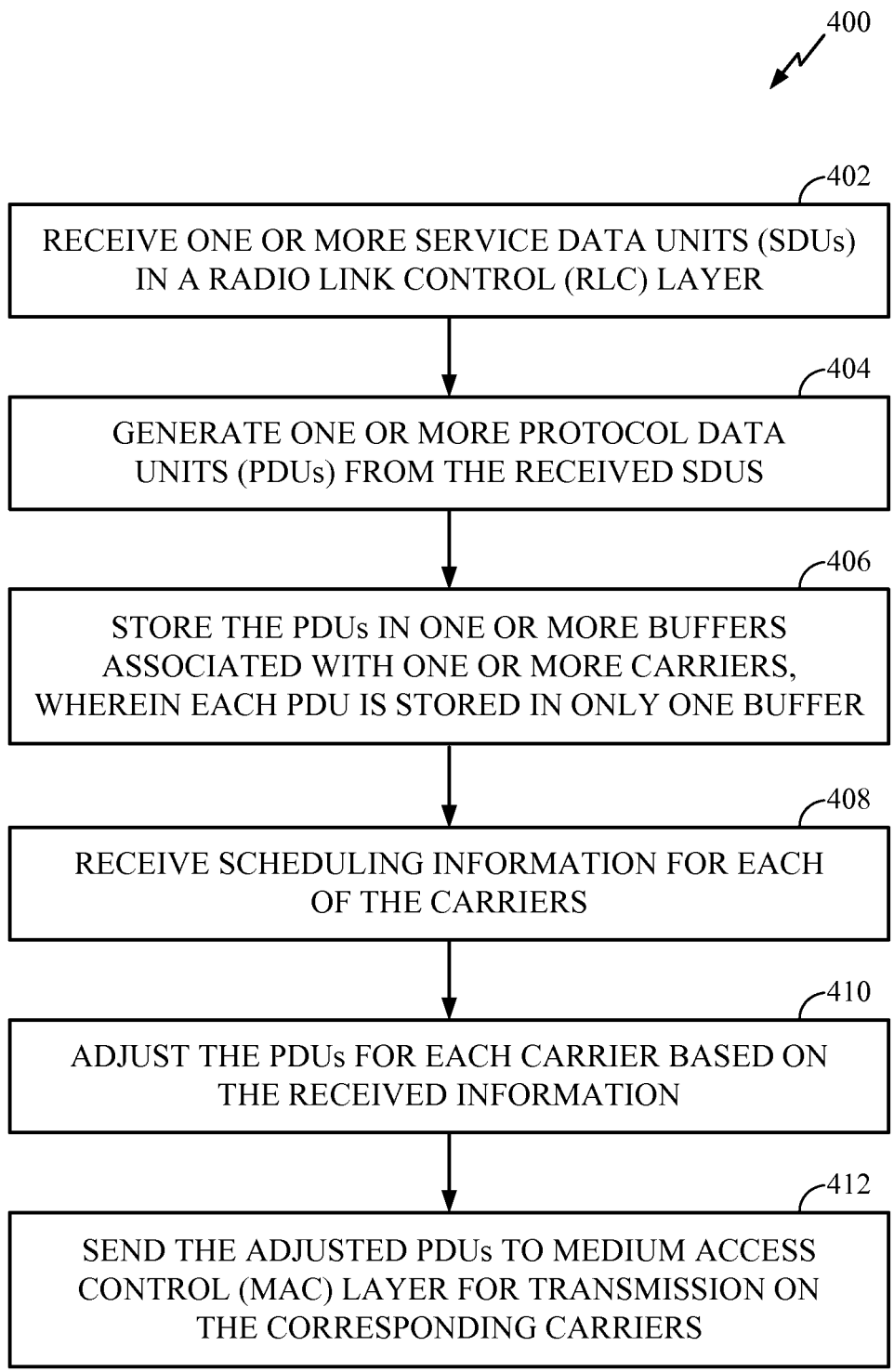
FIG. 4 illustrates example transmitter-side operations for a multi-carrier radio link control (RLC) layer, in accordance with certain embodiments of the present disclosure.

FIG. 4 illustrates example transmitter-side operations 400 for a multi-carrier radio link control (RLC) layer, in accordance with certain embodiments of the present disclosure. At 402, the transmitter receives one or more SDUs in an RLC layer. At 404, the transmitter generates one or more PDUs from the received SDUs. At 406, the transmitter stores the PDUs in one or more buffers associated with one or more carriers, wherein each PDU is stored in only one buffer. At 408, the transmitter receives scheduling information for each of the carriers. At 410, the transmitter adjusts the PDUs for each carrier based on the received information. At 412, the transmitter sends the adjusted PDUs to medium access control (MAC) layer for transmission on the corresponding carriers.

Figure 5:
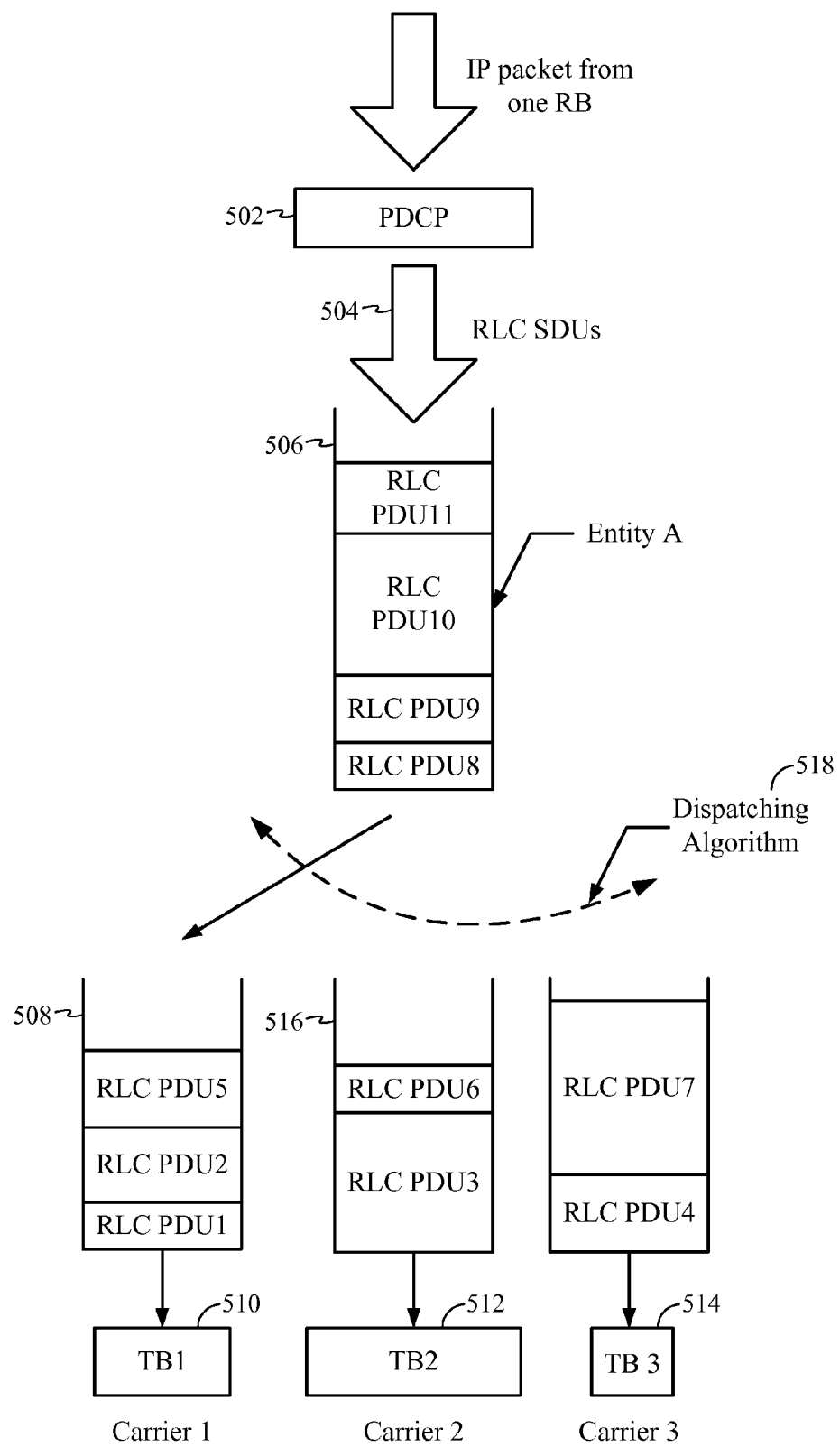
FIG. 5 illustrates an example diagram for assigning RLC protocol data units (PDUs) to multiple carriers, in accordance with certain embodiments of the present disclosure.

FIG. 5 illustrates the proposed multi-carrier scheme, in accordance with certain embodiments of the present disclosure. An entity (e.g., entity A 506) in the eNB may buffer all of the incoming RLC SDUs 504 from a radio bearer (RB) in a PDCP layer 502 to generate RLC PDUs (e.g., fixed size) even before the size of the TB for each carrier is available. Entity A may dispatch these RLC PDUs across all carriers based on the proposed algorithm 518.

When scheduling information is known and a TB size is decided for each serving carrier, the serving carriers may try to fit the pre-generated RLC PDUs that are stored in buffers 508, 516 into the TBs 510, 512 associated with each carrier. If the TB size is large enough to fit multiple pre-generated RLC PDUs (e.g., TB2 512), the serving carrier will append two or more RLC PDUs to fill out the TB. If the last RLC PDU does not fit, the serving carrier may segment that RLC PDU and send a segmented RLC PDU in the TB. If the TB size is not large enough to fit even one pre-generated RLC PDU (e.g., TB3 514), the serving carrier may segment each RLC PDU and send a segmented RLC PDU to the next layer for transmission over the channel.

Due to unfavorable channel conditions, the receiver may not receive some of the RLC PDUs. Therefore, the receiver may utilize Hybrid Automatic Repeat Request (HARQ) to ask for retransmission of the lost packets (e.g., RLC PDUs). However, HARQ may result in out-of-order reception of the RLC PDUs. Hence, the lost RLC PDUs may need to be detected and the PDUs may need to be re-ordered. To detect a lost RLC PDU, the receiver may rely on the serial number (SN) of the RLC PDUs.

For example, if RLC SN 1 and 3 are received, the RLC receiver may start a re-ordering timer and wait for RLC PDU 2 to arrive. If the timer expires and RLC PDU 2 is still not received, the receiver may send a Status Report to the transmitter asking for retransmission of RLC PDU 2. The value of the timer should allow enough time for any HARQ transmission to finish so when the timer expires, the receiver is sure that the PDU is missing as opposed to be delayed in HARQ buffer.

Value of the timer depends on the expected round trip time (RTT) of HARQ, which includes a scheduling delay. In the single carrier case, the RTT may be estimated much easier, since all transmissions happen on a single carrier. For certain embodiments, in the multi-carrier systems, because the pre-generated RLC PDUs are dispatched across the carriers, the average RTT may be estimated by considering the queuing delay in each carrier, varying radio channel condition of each carrier, and the dispatching algorithm used to distribute the RLC PDUs across the carriers. Therefore, the re-ordering timer may need to be set higher to account for potential larger queuing delay and varying channel conditions of the carriers for the HARQ.

Figure 6:
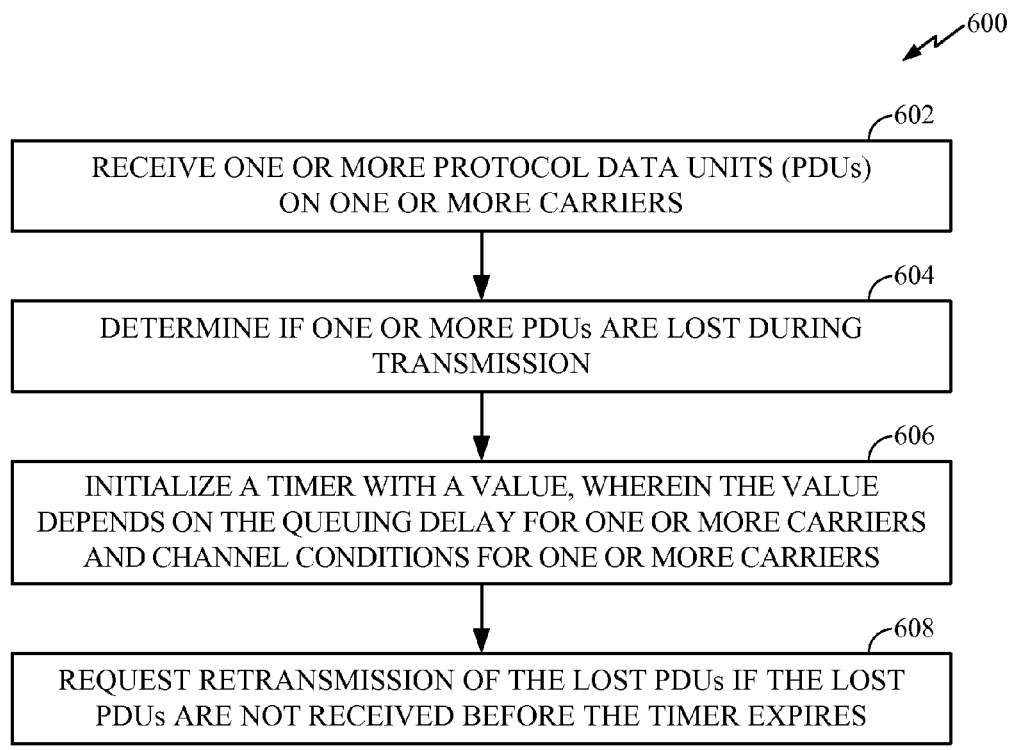
FIG. 6 illustrates example receiver-side operations for a multi-carrier RLC layer, in accordance with certain embodiments of the present disclosure.

FIG. 6 illustrates example receiver-side operations 600 for a multi-carrier RLC layer, in accordance with certain embodiments of the present disclosure. At 602, the receiver receives one or more PDUs on one or more carriers. At 604, the receiver determines if one or more PDUs are lost during transmission. The receiver may determine the lost PDUs by checking if there are one or more missing sequence numbers among consecutive sequence numbers of the received PDUs. At 606, the receiver initializes a timer with a value, wherein the value depends at least on the queuing delay for one or more carriers and channel conditions for one or more carriers. At 608, the receiver requests retransmission of the lost PDUs if the lost PDUs are not received before the timer expires.

For certain embodiments, a retransmission of an RLC PDU may be scheduled on a carrier different from the the carrier on which the RLC PDU was previously transmitted. For example, if RLC PDU was transmitted on carrier 1 and it was lost, if carrier 1 is congested, entity A may move the RLC PDU to carrier 2 for retransmission.

There are several advantages for the proposed multi-carrier system. First, it may reuse most of the hardware that are in compliance with the release 8 of the LTE standard. It may also require minimal changes to the standard. In the proposed method, the RLC layer may transmit segmented RLC PDUs even in the first transmission. Therefore, processing time and resources required to fill the TBs corresponding to each carrier, after the scheduling information becomes available, may be reduced by pre-generating the RLC PDUs and storing them in buffers associated with each carrier.

Figure 4A:
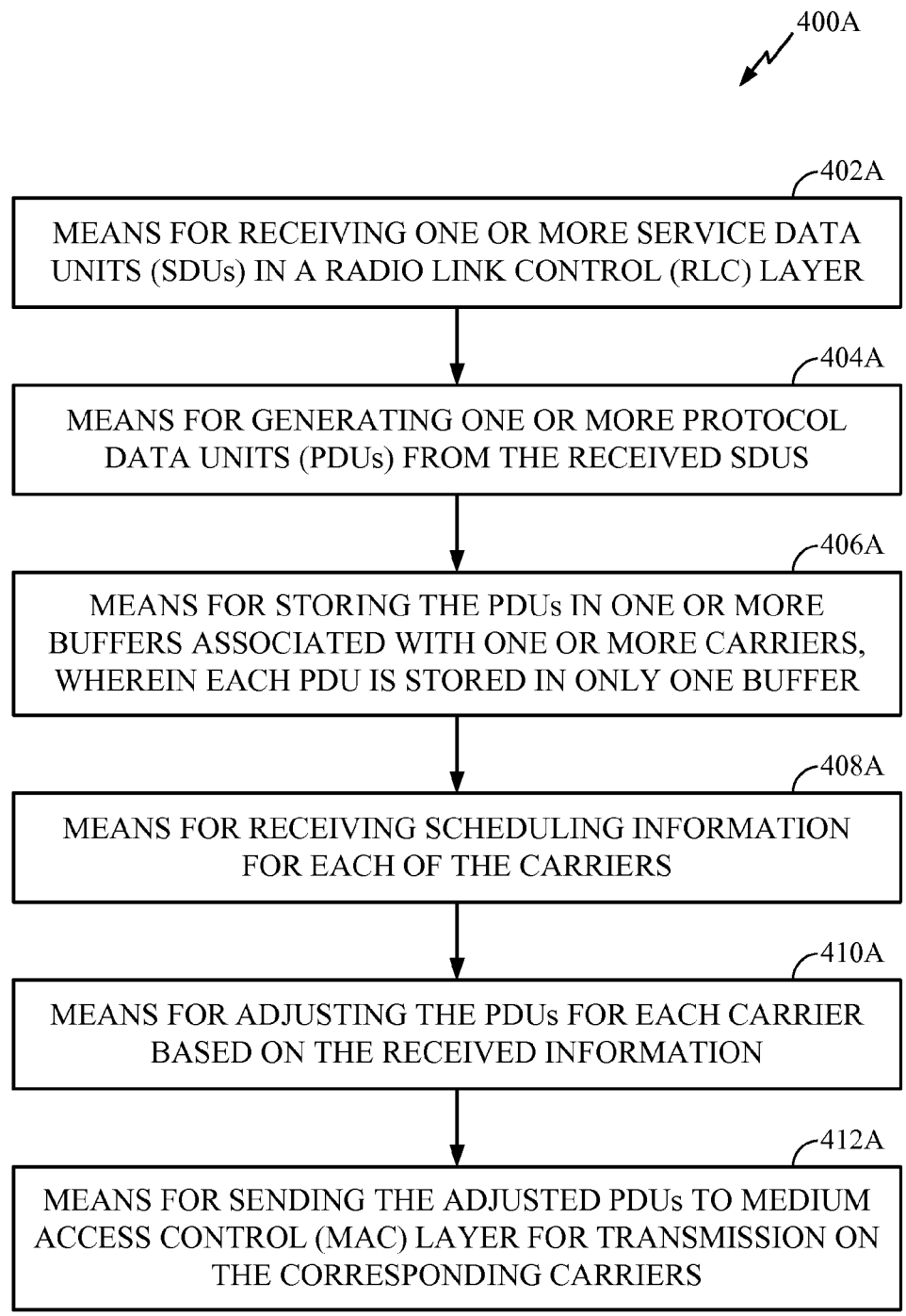
FIG. 4A illustrates example components capable of performing the operations illustrated in FIG. 4.
Figure 6A:
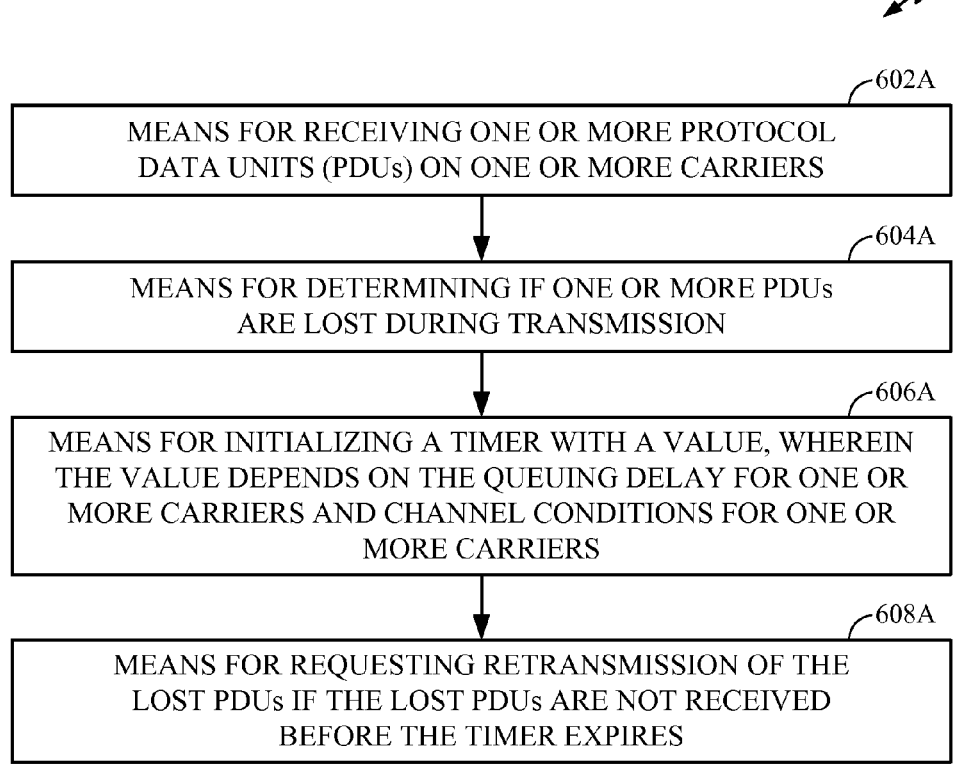
FIG. 6A illustrates example components capable of performing the operations illustrated in FIG. 6.

The various operations of methods described above may be performed by various hardware and/or software component(s) and/or module(s) corresponding to means-plus-function blocks illustrated in the Figures. For example, blocks 402-412 illustrated in FIG. 4 correspond to means-plus-function blocks 402A-412A illustrated in FIG. 4A. In addition, blocks 602-608 illustrated in FIG. 6 correspond to means-plus-function blocks 602A-608A illustrated in FIG. 6A.

More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications, comprising:
    receiving one or more service data units (SDUs) in a radio link control (RLC) layer;
    generating one or more protocol data units (PDUs) from the received SDUs;
    storing the PDUs in one or more buffers associated with one or more carriers, wherein each of the PDUs is generated in advance of receiving scheduling information and is stored in only one of the buffers;

receiving the scheduling information for each of the one or more carriers;
adjusting the PDUs for each of the carriers based on the received scheduling information; and
sending the adjusted PDUs to medium access control (MAC) layer for transmission on the associated carriers.

2. The method of claim 1, wherein the PDUs have a fixed size.

3. The method of claim 1, wherein the scheduling information comprises size of a transport block for each of the carriers.

4. The method of claim 1, wherein adjusting the PDUs for each of the carriers comprises:
appending one or more of the PDUs to generate a PDU with a size equal or larger than a size of a transport block for each of the carriers.

5. The method of claim 4, further comprising:
segmenting a last PDU of the one or more PDUs appended by the appending, if a size of the one or more PDUs subject to the appending is larger than the size of the transport block.

6. An apparatus for wireless communications, comprising:
a hardware module configured for receiving one or more service data units (SDUs) in a radio link control (RLC) layer;
a hardware module configured for generating one or more protocol data units (PDUs) from the received SDUs;
a hardware module configured for storing the PDUs in one or more buffers associated with one or more carriers, wherein each of the PDUs is generated in advance of receiving scheduling information and is stored in only one of the buffers;
a hardware module configured for receiving the scheduling information for each of the one or more carriers;
a hardware module configured for adjusting the PDUs for each of the carriers based on the received scheduling information; and
a hardware module configured for sending the adjusted PDUs to medium access control (MAC) layer for transmission on the associated carriers.

7. The apparatus of claim 6, wherein the PDUs have a fixed size.

8. The apparatus of claim 6, wherein the scheduling information comprises size of a transport block for each of the carriers.

9. The apparatus of claim 6, wherein the hardware module configured for adjusting the PDUs for each of the carriers comprises:
a hardware module configured for appending one or more of the PDUs to generate a PDU with a size equal or larger than a size of a transport block for each of the carriers.

10. The apparatus of claim 9, further comprising:
a hardware module configured for segmenting a last PDU of the one or more PDUs appended by the hardware module configured for appending, if a size of the one or more PDUs subject to the appending is larger than the size of the transport block.

11. An apparatus for wireless communications, comprising:
means for receiving one or more service data units (SDUs) in a radio link control (RLC) layer;
means for generating one or more protocol data units (PDUs) from the received SDUs;
means for storing the PDUs in one or more buffers associated with one or more carriers, wherein each of the PDUs is generated in advance of receiving scheduling information and is stored in only one of the buffers;
means for receiving the scheduling information for each of the one or more carriers;
means for adjusting the PDUs for each of the carriers based on the scheduling information; and
means for sending the adjusted PDUs to medium access control (MAC) layer for transmission on the associated carriers.

12. The apparatus of claim 11, wherein the PDUs have a fixed size, and wherein the scheduling information comprises size of a transport block for each of the carriers.

13. The apparatus of claim 11, wherein the means for adjusting the PDUs for each of the carriers is further configured for appending one or more of the PDUs to generate a PDU with a size equal or larger than a size of a transport block for each of the carriers.

14. The apparatus of claim 13, wherein the means for adjusting the PDUs for each of the carriers is further configured for segmenting a last PDU of the one or more PDUs appended by the appending, if a size of the one or more PDUs subject to the appending is larger than the size of the transport block.

15. A computer-program product for wireless communications, comprising a non-transitory computer readable medium having instructions stored thereon, the instructions being executable by one or more processors and the computer-program comprising:
instructions for receiving one or more service data units (SDUs) in a radio link control (RLC) layer;
instructions for generating one or more protocol data units (PDUs) from the received SDUs;
instructions for storing the PDUs in one or more buffers associated with one or more carriers, wherein each of the PDUs is generated in advance of receiving scheduling information and is stored in only one of the buffers;
instructions for receiving the scheduling information for each of the one or more carriers;
instructions for adjusting the PDUs for each of the carriers based on the scheduling information; and
instructions for sending the adjusted PDUs to medium access control (MAC) layer for transmission on the associated carriers.

16. The computer-program product of claim 15, wherein the PDUs have a fixed size, and wherein the scheduling information comprises size of a transport block for each of the carriers.

17. The computer-program product of claim 15, wherein the instructions for adjusting the PDUs for each of the carriers comprises:
instructions for appending one or more of the PDUs to generate a PDU with a size equal or larger than a size of a transport block for each of the carriers.

18. The computer-program product of claim 17, wherein the computer-program product further comprises:
instructions for segmenting a last PDU of the one or more PDUs appended by the appending, if a size of the one or more PDUs subject to the appending is larger than the size of the transport block.

19. An apparatus for wireless communications, comprising at least one processor configured to:
receive one or more service data units (SDUs) in a radio link control (RLC) layer;
generate one or more protocol data units (PDUs) from the received SDUs;
store the PDUs in one or more buffers associated with one or more carriers, wherein each of the PDUs is generated in advance of receiving scheduling information and is stored in only one of the buffers;

receive the scheduling information for each of the one or more carriers;

adjust the PDUs for each of the carriers based on the scheduling information; and send the adjusted PDUs to medium access control (MAC) layer for transmission on the associated carriers.

20. The apparatus of claim 19, wherein the PDUs have a fixed size, and wherein the scheduling information comprises size of a transport block for each of the carriers.

21. The apparatus of claim 19, wherein the at least one processor is configured to adjust the PDUs for each of the carriers by performing operations including:

appending one or more of the PDUs to generate a PDU with a size equal or larger than a size of a transport block for each of the carriers.

22. The apparatus of claim 21, wherein the at least one processor is further configured to:

segment a last PDU of the one or more PDUs appended by the appending, if a size of the one or more PDUs subject to the appending is larger than the size of the transport block.

\* \* \* \* \*